United States Patent [19]

Kline et al.

[11] Patent Number: 4,747,259

[45] Date of Patent: May 31, 1988

[54] GRASS CATCHING ASSEMBLY AND DISPOSABLE BAG THEREFOR

[76] Inventors: Daniel J. Kline, 1709 Marks Ave.; Kenneth A. Roberts, Jr., 1532 Osage Ave., both of Akron, Ohio 44305

[21] Appl. No.: 914,013

[22] Filed: Oct. 1, 1986

[51] Int. Cl.[4] .................... A01D 34/70; A01D 34/48
[52] U.S. Cl. ...................................... 56/202; 56/320.2
[58] Field of Search .................. 56/202, 320.2, 199, 56/198, 194; 383/37; 206/554; 224/42.45 R, 42.42

[56] References Cited

U.S. PATENT DOCUMENTS

| | | | |
|---|---|---|---|
| 2,973,614 | 3/1961 | Horner et al. | 56/320.2 |
| 3,492,800 | 2/1970 | Peterson et al. | 56/202 |
| 3,561,201 | 2/1971 | Dahl | 56/202 |
| 3,574,272 | 4/1971 | Krewson | 56/202 |
| 3,928,956 | 12/1975 | Boyer | 56/202 |
| 3,995,414 | 12/1976 | Kerr et al. | 56/202 |
| 4,076,121 | 2/1978 | Clayton et al. | 206/554 |
| 4,149,362 | 4/1979 | Haffner et al. | 56/202 |
| 4,326,370 | 4/1982 | Thorud | 56/320.2 |
| 4,566,257 | 1/1986 | Akrabawi | 56/202 |

FOREIGN PATENT DOCUMENTS

| | | | |
|---|---|---|---|
| 0274909 | 8/1965 | Australia | 56/202 |
| 0716774 | 8/1965 | Canada | 56/202 |

Primary Examiner—Paul J. Hirsch
Assistant Examiner—Vincent Ciamacco
Attorney, Agent, or Firm—Renner, Kenner, Greive, Bobak & Taylor

[57] ABSTRACT

A grass catching assembly (20) for a lawn mower (10) includes an adapter assembly (21, 52) attachable to the grass discharge area of the mower (10). A disposable bag (26) is attached to the adapter so that mowed grass from the mower (10) is passed through the adapter (21, 52) and into the disposable bag (26).

12 Claims, 3 Drawing Sheets

4,747,259

GRASS CATCHING ASSEMBLY AND DISPOSABLE BAG THEREFOR

TECHNICAL FIELD

This invention relates to a grass catching assembly for use with conventional lawn mowers. More particularly, this invention relates to an assembly for catching grass, leaves and like debris which utilizes a disposable bag for convenient handling of the grass being collected.

BACKGROUND ART

The user of a lawn mower has two basic choices regarding the disposition of the grass that is being cut. He can merely permit the cut grass to be scattered over the lawn and either manually rake it up later, a time consuming effort, or merely leave it there, hopefully for subsequent decomposition. In this latter situation, the cut grass is not only unsightly, but it also can have a detrimental effect on the uncut lawn.

The alternative is to collect that cut grass, leaves and other debris in a variety of types of grass catching accessories usually available from the manufacturer of the mower. Most of these accessories utilize some type of bag or container attachment to the mower to collect the grass clippings. While these bag attachments most often adequately collect the mowed grass, they become filled frequently during one mowing session resulting in the need to periodically stop the lawn mower, empty the bag into some receptacle for ultimate disposal, and remount the bag for continued mowing—all a time consuming process. Furthermore, these bags, which are usually made of a canvas or like material, frequently wear out and need to be replaced.

DISCLOSURE OF THE INVENTION

It is thus a primary object of the present invention to provide a grass catching assembly with a disposable bag so that the transfer of grass clippings from a reusable container to another receptacle is avoided.

It is another object of the present invention to provide a grass catching assembly, as above, which is readily adaptable to be used with any type of lawn mower presently on the market.

It is a further object of the present invention to provide a unique disposable bag for a grass catching assembly.

It is an additional object of the present invention to provide a unique disposable bag, as above, which can readily be provided on a roll dispenser carried by the lawn mower.

These and other objects of the present invention, which will become apparent from the description to follow, are accomplished by the improvements hereinafter described and claimed.

In general, the grass catching assembly of the present invention is adapted to be used with all styles of lawn mowers or lawn vacuums which discharge the mowed grass, leaves and the like, usually through some type of discharge chute. An adapter can be attached, at one end, to the discharge chute. A disposable bag is attached to the other end of the adapter so that grass is discharged from the mower, through the adapter and into the bag.

PREFERRED EMBODIMENT FOR CARRYING OUT THE INVENTION

Figure 1:
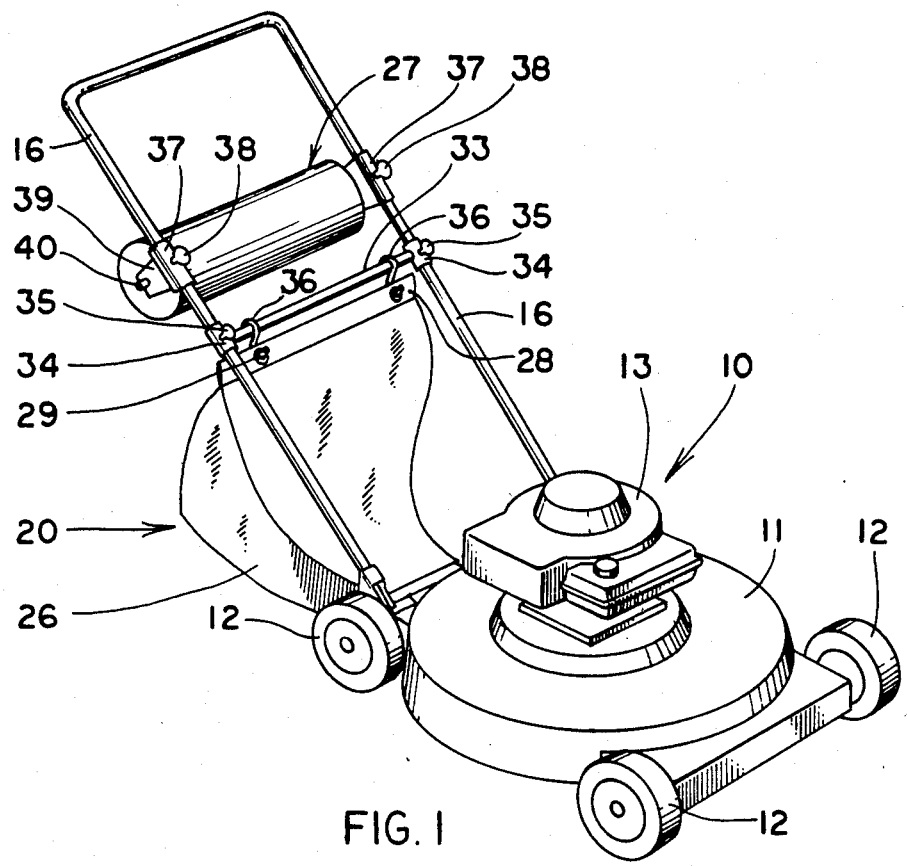
FIG. 1 is a somewhat schematic perspective view of the grass catching assembly of the present invention shown as being used with a mower having a rear grass discharge and also showing a bag roll dispenser being used therewith.

A conventional lawn mower is indicated generally by the numeral 10 in FIG. 1 and is of the type generally known as a rotary mower having a generally circular blade housing 11 supported by wheels 12 and carrying motor 13. Actuation of motor 13 propels the blade within housing 11 and the mowed grass, leaves and other loose debris are propelled, in this type of mower, through a rear discharge area 14 having a safety hinged door 15. Mower 10 is guided by means of a generally U-shaped handle 16.

Figure 2:
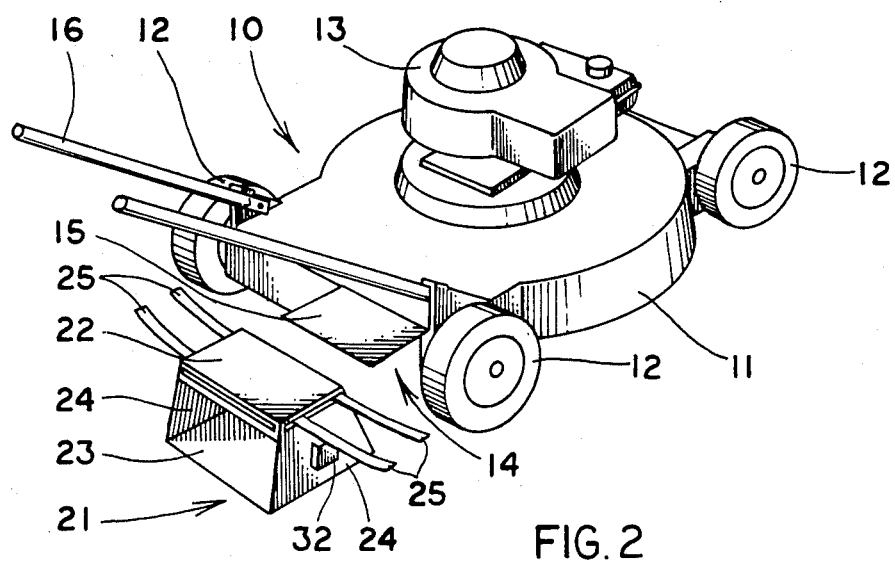
FIG. 2 is a somewhat schematic perspective view of the mower of FIG. 1 showing the manner in which the grass catching assembly attaches to the mower.

A grass catching assembly according to the concept of the present invention is generally indicated by the numeral 20 and includes an adapter assembly generally indicated by the numeral 21 and best shown in FIG. 2. Adapter assembly 21 includes a generally rectangular top plate 22 and rectangular bottom plate 23 being connected by trapazoidal shaped side plates 24. Together plates 22, 23 and 24 provide a tunnel through which grass may pass from mower blade housing 11.

Adapter 21 can be attached to mower 10 by any number of conventional manners with self fastening strips of material, such as Velcro strips 25, being shown as one example. Strips 25 can be fastened around chute door 15 to hold adapter 21 thereto so that the front open end of adapter 21 mates with the discharge opening of mower 10. While strips 25 provide a particularly suitable attachment mechanism because they can easily be unfastened and refastened, if necessary, it should be evident that adapter 21 could be permanently attached to the mower as by screws or the like.

Figure 5:
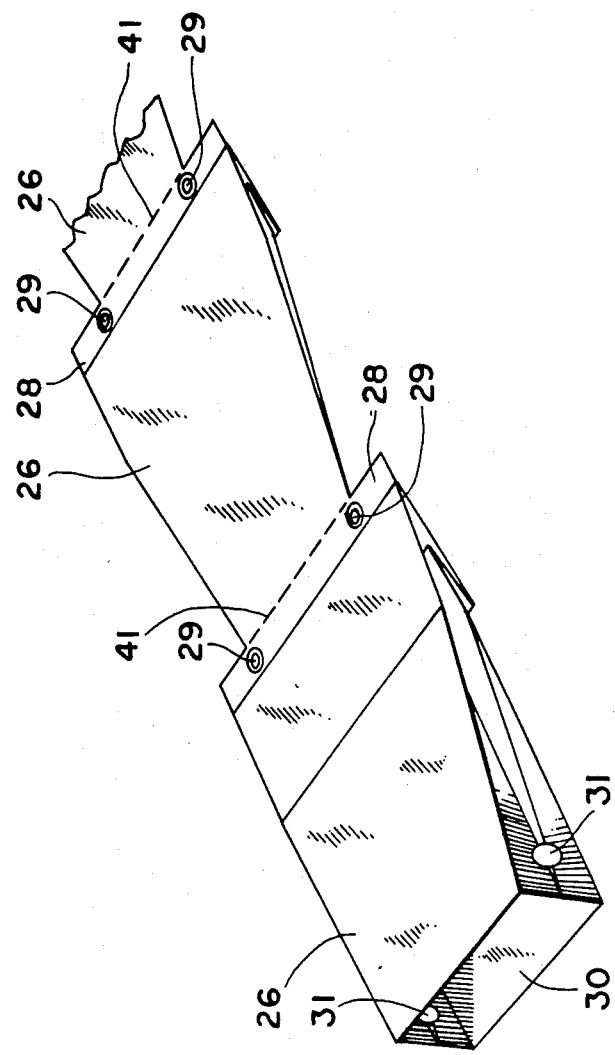
FIG. 5 is a partial perspective view of the disposable bags according to the present invention as they would be dispensed off of the roll shown in FIG. 1.

The trapazoidal shape of side plates 24 allows for the effective tilting of adapter 21 as its front open end is flush with the discharge opening of mower 10. Thus, the rear open end is canted upwardly to mate with an upwardly extending disposable bag 26. Bag 26 may be made of any type of economically disposable material, such as polypropylene, much like the common refuse container liners presently on the market. However, as shown in FIG. 5, bag 26 is specially constructed for use with grass catching assembly 20. As will hereinafter be described in more detail, bag 26 may be supplied from a roll 27 shown in FIG. 1, or may be individually supplied from a box or other container. While the bags 26 shown in FIG. 5, are shown as coming off a roll 27, it should be appreciated that if bags were individually supplied, their configuration would be the same.

With reference to FIGS. 1 and 5, each bag 26 has a flat support tab 28 at its closed end supplied with grommet-like reinforced openings 29 therein. Bags 26 are formed to taper inwardly from their closed end to their open end thereby forming a mouth 30 of reduced size. In general, the size of mouth 30 should approximately correspond to the size of the rear open end of adapter 21. Bag 26 is also provided with apertures 31 in the sides thereof just behind mouth 30 for ease of attachment to adapter 21. To this end, each plate 24 of adapter 21 is provided with an ear 32 which engage apertures 31 in bag 26. When so assembled, mouth 30 of bag 26 is conveniently over the canted rear open end of adapter 21 so that bag 26 will receive the grass clippings passing therethrough.

Grass catching assembly 20 also includes a support bar 33 to hold the rear of bag 26 upward between the branches of U-shaped handle 16. Bar 33, which may be spring loaded so as to accommodate different sized handles, is provided with a semi-cylindrical collar 34 at each end to engage handle 16. A thumb screw 35 extends through each collar 34 and thus support bar 33 may be selectively positioned longitudinally along the branches of U-shaped handle 16. The thumb screw 35 and collar 34 arrangement also renders grass catching assembly 20 universally adaptable to mount on handles 16 of varying diameters. Bag 26 may be attached to the properly positioned bar 33 as by hooks 36 extending around bar 33 and through openings 29 in bag 26.

If bags 26 are provided on roll 27, it may be convenient to carry the roll on mower 10. To that end, semi-cylindrical collars 37 with thumb screws 38, generally like collars 34 and thumb screws 35, may be provided to adjustably position roll 27 on handle 16. Roll support flanges 39 extend downwardly from collars 37 to rotatably receive the axle 40 of roll 27. Thus, when a bag 26 currently catching grass becomes full, it may be removed from adapter 21 and hooks 36, a new bag 26 dispensed from roll 27, torn off of roll 27 along perforations 41 shown in FIG. 5, and mounted on adapter 21 and hooks 36.

The manner in which grass catching assembly 20 may be modified to accommodate other types of mowers should be apparent. One example of such a modification is shown in FIGS. 3 and 4, where parts identical to those described with respect to FIGS. 1 and 2 are given identical numbers and will not be redescribed herein.

Figure 3:
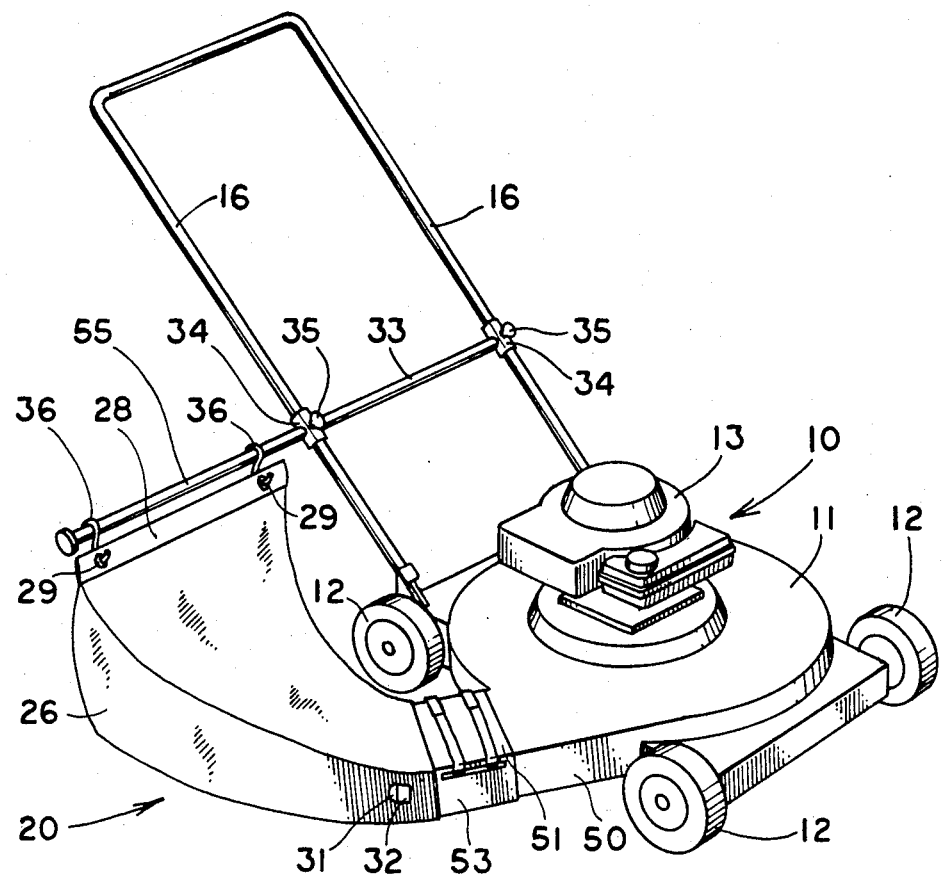
FIG. 3 is a somewhat schematic perspective view of the grass catching assembly of the present invention shown as being used with a mower having a side grass discharge.
Figure 4:
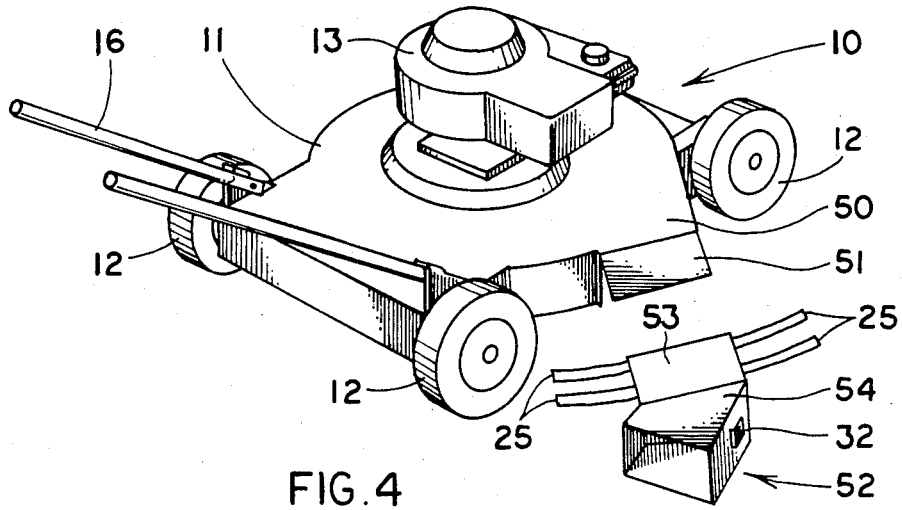
FIG. 4 is a somewhat schematic perspective view of the mower of FIG. 3 showing the manner in which the grass catching assembly attaches to the mower.

Mower 10 of FIGS. 3 and 4 is of the rotary type having a side grass discharge chute 50 which normally has a safety door 51 associated therewith. Because of the side discharge of grass, an adapter indicated generally by the numeral 52, of slightly different construction than adapter 21, but operating in generally the same way, is required. Adapter 52 is shown as having a generally rectangular duct portion 53 with a bag mounting portion 54 angularly extending therefrom. Again, Velcro strips 25 may be used to attach duct portion 53 to door 51 and ears 32 on bag mounting portion 54 used to engage apertures 31 of bag 26.

The angularity of portions 53 and 54 of adapter 52 accounts for the side grass discharge and otherwise permits bag 26 to be carried at the side of mower 10. To this end support bar 33 does not directly carry bag 26, as was the case with the rear discharge mower of FIGS. 1 and 2, but rather carries, through collar 34, a mast arm 55 extending outward of handle 16. Mast arm 55 thus carries hooks 36 which engage bag 26. If the roll 27 feature of the present invention were desired, it too could be added to the FIGS. 3 and 4 mower or, even more conveniently, bar 33 could be used for that purpose since it is not directly carrying bag 26.

From the foregoing it should be apparent that the concept of the present invention is universally adaptable to be utilized with any standard lawn mower or lawn vacuum. Use of the disposable bag readily attachable to and detachable from the mower results in a substantial time savings such that a grass catching assembly constructed as described herein substantially improves the art and otherwise accomplishes the objects of the invention.

We claim:

1. In combination with a lawn mower having a handle and a grass discharge area, a grass catching assembly comprising, an adapter assembly through which mowed grass may pass, means to attach one end of said adapter assembly to the grass discharge area of the lawn mower so that mowed grass being discharged will pass through said adapter assembly, a disposable bag having a front open mouth and rear closed end for catching the grass, means to attach said mouth of said disposable bag to the other end of said adapter assembly, a supply roll of disposable bags, and support means connected to the handle of the lawn mower to carry said supply roll of disposable bags.

2. A grass catching assembly according to claim 1 wherein the lawn mower is of the type having a rear grass discharge area, further comprising second support means attached to the handle of the mower to hold said rear closed end of said disposable bag.

3. A grass catching assembly according to claim 2 further comprising means to adjust the position of said second support means on the handle of the mower.

4. A grass catching assembly according to claim 1 wherein the lawn mower is of the type having a side grass discharge area, further comprising mast arm means extending outwardly from the handle of the mower to hold said rear closed end of said disposable bag.

5. A grass catching assembly according to claim 1 further comprising means to adjust the position of said support means on the handle of the mower.

6. A grass catching assembly according to claim 1 wherein said means to attach said mouth of said disposable bag to the other end of the adapter assembly includes ear members on said adapter assembly.

7. A grass catching assembly according to claim 6 wherein said means to attach said mouth of said disposable bag to the other end of the adapter assembly includes apertures in said disposable bag to engage said ear members on said adapter assembly.

8. A grass catching assembly according to claim 1 wherein said means to attach one end of said adapter assembly to the mower includes self fastening strips attached to said adapter assembly for engaging the mower.

9. A grass catching assembly according to claim 1 wherein said disposable bag tapers inwardly from said rear closed end to said front open mouth thereby rendering said mouth smaller than said closed end.

10. A grass catching assembly according to claim 1 wherein said disposable bag includes a support tab at said rear closed end.

11. A grass catching assembly according to claim 1 wherein the mower is of the type having a rear grass discharge area, said adapter assembly including top and bottom plates, and trapazoidal shaped side plates connecting said top and bottom plates, said trapazoidal shaped side plates providing a tapered edge for said adapter assembly such that said adapter assembly is canted as it engages the grass discharge area.

12. A grass catching assembly according to claim 1 wherein the mower is of the type having a side grass discharge area, said adapter assembly including a duct portion attached to said side discharge area, and a bag mounting portion angular to said duct portion for engaging said disposable bag.

* * * * *